(12) United States Patent
Pöchmüller

(10) Patent No.: US 6,448,749 B2
(45) Date of Patent: Sep. 10, 2002

(54) CIRCUIT CONFIGURATION FOR REGULATING THE POWER CONSUMPTION OF AN INTEGRATED CIRCUIT

(75) Inventor: Peter Pöchmüller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/752,920

(22) Filed: Jan. 2, 2001

(30) Foreign Application Priority Data

Dec. 30, 1999 (DE) ........................... 199 63 813.6

(51) Int. Cl.[7] ................................ G05F 1/40
(52) U.S. Cl. ................... 323/282; 323/284; 327/513
(58) Field of Search ................... 323/282, 281, 323/280, 283, 284, 285, 286; 327/378, 512, 513; 307/296.06

(56) References Cited

U.S. PATENT DOCUMENTS

| | | | | |
|---|---|---|---|---|
| 3,532,960 A | * | 10/1970 | Webb | 363/30 |
| 3,924,102 A | * | 12/1975 | Hanekom | 219/497 |
| 4,849,611 A | * | 7/1989 | Whitney et al. | 219/538 |
| 5,822,203 A | * | 10/1998 | Peron | 363/125 |
| 5,886,564 A | * | 3/1999 | Sato et al. | 327/513 |
| 6,169,391 B1 | * | 1/2001 | Lei | 323/266 |
| 6,172,885 B1 | * | 1/2001 | Feldkeller | 363/98 |
| 6,222,746 B1 | * | 4/2001 | Kim | 363/89 |

FOREIGN PATENT DOCUMENTS

| | | |
|---|---|---|
| DE | 2 207 735 | 8/1973 |
| DE | 198 28 176 A1 | 1/1999 |
| EP | 0 162 870 B1 | 12/1985 |
| GB | 716278 | 9/1954 |
| GB | 1 231 904 | 5/1971 |
| JP | 60 124 715 A | 7/1985 |
| WO | WO 96/19764 | 6/1996 |

OTHER PUBLICATIONS

The International Technology Roadmap for Semiconductors: 1999 edition, pp. 1 and 14, http:/public.itrs.net/files/1999_SIA_Roadmap/ORTC.pdf, no date available.

* cited by examiner

Primary Examiner—Rajnikant B. Patel
(74) Attorney, Agent, or Firm—Laurence A. Greenberg; Werner H. Stemer; Gregory L. Mayback

(57) ABSTRACT

The present invention relates to an integrated circuit which is connected to a reference-ground potential and to a supply potential. Since differing activity in the integrated circuit results in a fluctuating current being drawn by the integrated circuit, current surges may arise on the supply potential. To prevent current surges on the supply potential, a controllable load is produced together with the integrated circuit, with the result that the power drawn by the combination of integrated circuit and the load is approximately constant.

8 Claims, 2 Drawing Sheets

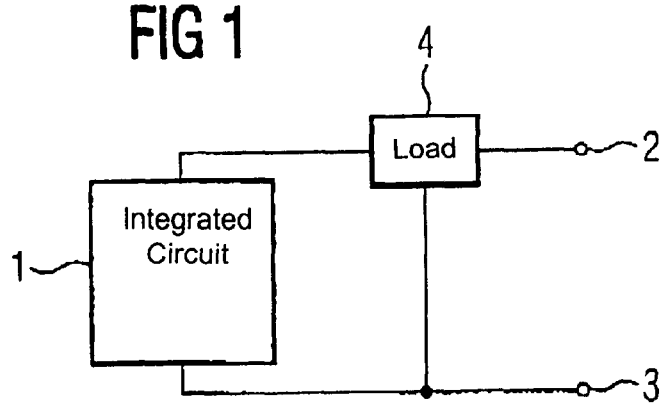
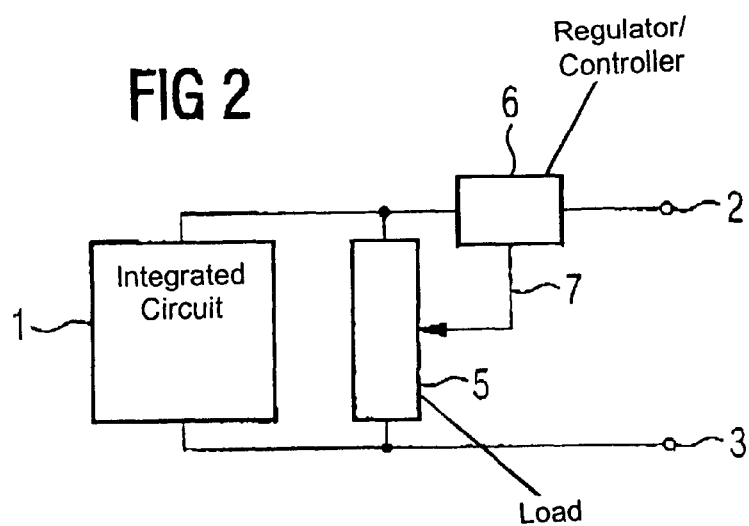
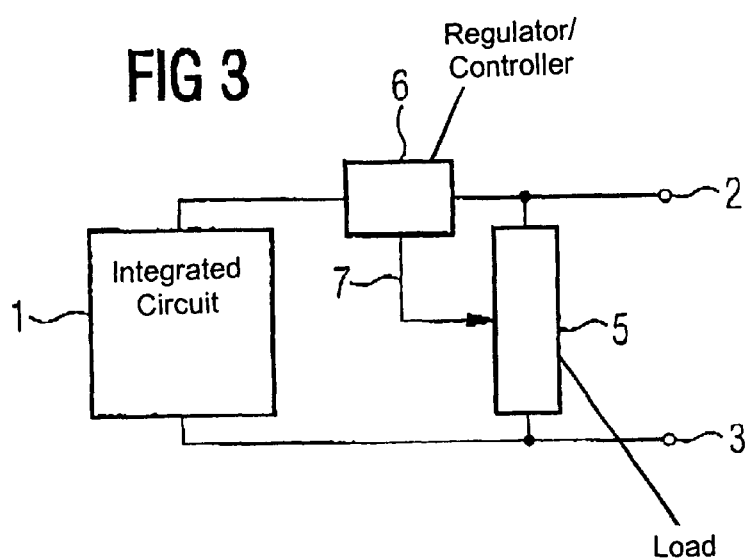

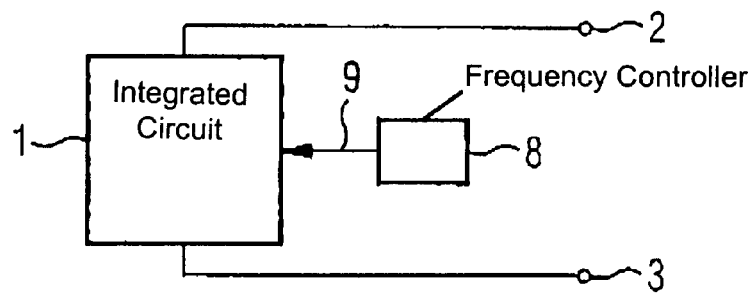
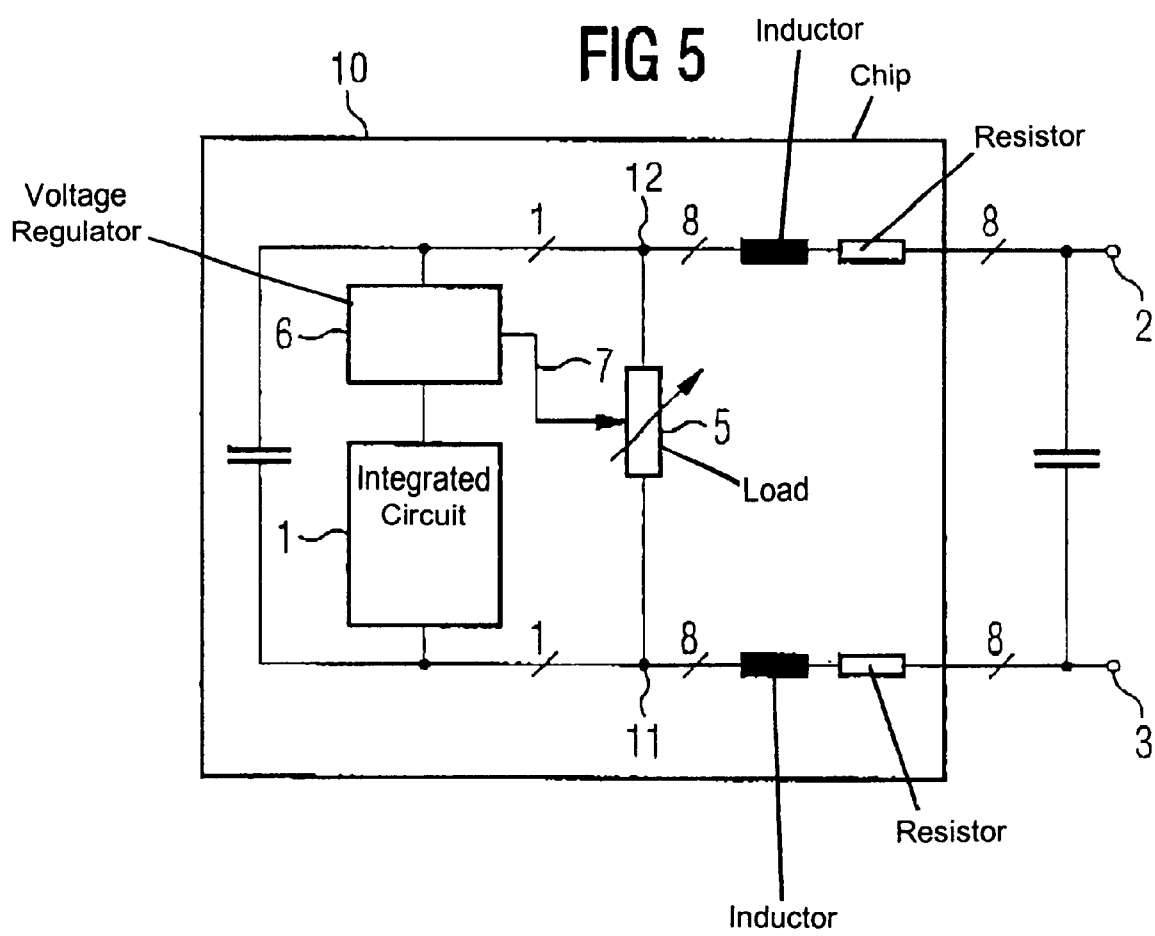

CIRCUIT CONFIGURATION FOR REGULATING THE POWER CONSUMPTION OF AN INTEGRATED CIRCUIT

BACKGROUND OF THE INVENTION

FIELD OF THE INVENTION

The present invention relates to a circuit configuration for regulating the power consumption of an integrated circuit.

Integrated circuits are supplied with energy by a supply voltage, with a current flowing into the integrated circuit. The power drawn and also the supply voltage and the current drawn in integrated circuits has been subject to change in the past. Thus, for example, the operating voltage of processors has been lowered from 5 volts to 3.3 volts.

It is expected that future development of integrated circuits will proceed in accordance with the International Technology Roadmap for Semiconductors, 1999 Edition, Overall Roadmap Technology Characteristics and Glossary (SIA Roadmap).

The SIA Roadmap (Semiconductor Industry Association) forecasts the expected future development of microelectronics, as seen by a consortium of firms.

The table below shows a comparison between today (1999) and the year 2011.

| Year, technology | 1999, 180 nm | 2011, 50 nm |
|---|---|---|
| Minimum supply voltage for logic VDD/volts | 1.8 | 0.6 |
| Power consumption/watts | 90 | 174 |
| Current consumption/amps | 50 | 290 |

This shows that, in the year 2011, a current of 290 amps is expected for a supply voltage of 0.6 volts. In this context, 290 amps should be regarded as a very high current value. The question arises as to how it is possible to impress 290 amps into an integrated circuit, since electrical wiring today is able to carry only one amp per bonding wire on account of electromigration. The solution to this problem is assisted by the large number of electrical connections, which will be in the order of magnitude of 10,000.

A further problem is the control of system noise. If, by way of example, an integrated circuit is changed from an idle state, in which the activity of the integrated circuit is low and hence the current drawn is likewise low, into a state with a high level of activity, this results in an abrupt change in current on the supply line of approximately 290 amps, which needs to be controlled. Even if the current supply line has a low power resistance of only 0.01 mΩ, an abrupt change in current of 100 amps results in a voltage drop of 1 volt. A voltage drop of this order of magnitude is unacceptable and is not possible when the integrated circuit is being operated with only a 0.6 volt supply voltage.

Typically, fluctuations in the supply voltage are tolerated in a range of 10% of the supply voltage.

SUMMARY OF THE INVENTION

It is accordingly an object of the invention to provide a circuit configuration for drawing power from a voltage source which overcomes the above-mentioned disadvantageous of the prior art apparatus of this general type, and in which the drawn power, as seen by a voltage source, is essentially uniform, at least intermittently.

With the foregoing and other objects in view there is provided, in accordance with the invention a circuit configuration for regulating power consumption of an integrated circuit. The circuit configuration includes an integrated circuit for drawing a power and which has electrical contacts for connecting to a supply voltage; and a load for drawing a controllable power which is dependent upon the power drawn by the integrated circuit.

The advantage of the solution according to the invention is the uniform power drawn by the integrated circuit as perceived by the voltage source. This response is advantageously permitted by a load which draws power in parallel with the integrated circuit when the integrated circuit is consuming relatively little power, with the result that the combination of integrated circuit and load draws an approximately constant power.

In accordance with an added feature of the invention, the load converts electrical energy into thermal energy. As a result of this configuration, the excess power is consumed.

In accordance with an additional feature of the invention, the load is controlled such that the power consumption of the combination of the integrated circuit and the load is essentially constant. The effect achieved by this regulating measure is that the power drawn by the combination of integrated circuit and load is essentially constant at least intermittently. This prevents current surges and current dips on the supply line.

A further advantage is that the load draws more power when the integrated circuit is drawing relatively little power. This approach means that the power not consumed by the integrated circuit is drawn by the load, and current surges and current dips on the supply lines are likewise prevented.

In accordance with another feature of the invention, the power drawn by the load is reduced during a period of time when the power drawn by the load is essentially constant. This makes it possible to lower the power drawn by the combination of integrated circuit and load at times of little activity, when the load is drawing a large part of the power. This is preferably effected using a time constant which is large in comparison with the reciprocal of an operating frequency of the integrated circuit. This reduces the total power drawn by the combination of integrated circuit and load, which lengthens the operating time of a battery-operated circuit. In addition, the power drawn by the load is not reduced entirely to zero so that there is a reserve for an increase in consumption by the integrated circuit. The reserve is available immediately if the integrated circuit draws more power.

In accordance with a further feature of the invention, the load, the load controller and/or a load regulator are/is configured in the integrated circuit. This permits a compact design requiring no additional effort outside the integrated circuit.

In accordance with a further added feature of the invention, the load includes a controllable resistor, a transistor, a capacitor and/or a further integrated circuit. A transistor may be in the form of, by way of example, a field-effect transistor or bipolar transistor and can be connected to circuit elements such as resistors, capacitors and inductors. In addition, it is advantageous for the load to be in the form of a further integrated circuit. Activation of sub-regions of the further integrated circuit permits the power drawn to be controlled.

In accordance with a further additional feature of the invention, the power consumption of the combination of integrated circuit and load are lowered when the integrated circuit is transferred to an idle state. This prevents switching pulses and current surges on the supply lines, which could result in voltage drops in the supply voltage.

In accordance with a concomitant feature of the invention, the operating frequency of the integrated circuit is lowered when the integrated circuit is transferred to an idle state. This approach slowly lowers the power drawn by the integrated circuit when transferring to an idle state, and current surges on the supply lines are prevented.

Other features which are considered as characteristic for the invention are set forth in the appended claims.

Although the invention is illustrated and described herein as embodied in a circuit configuration for regulating the power consumption of an integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows an inventive configuration with a load having a regulator/controller;

FIG. 2 shows another inventive configuration with a load and a separate regulator/controller;

FIG. 3 shows another inventive configuration with a load and a separate regulator/controller;

FIG. 4 shows an inventive configuration for frequency control; and

FIG. 5 shows another inventive configuration with a load.

DESCRIPTION OF THE PREFERRED EMBODIMENTS

Referring now to the figures of the drawing in detail and first, particularly, to FIG. 1 thereof, there is shown an integrated circuit 1 that is suitable for making the power consumption between a supply potential 2 and a reference-ground potential 3 uniform, at least intermittently. This is achieved by virtue of the fact that the load 4 with the integrated regulator/controller draws a constant power via the supply potential 2 and, depending on requirements, passes it on to the integrated circuit 1 or consumes it directly.

In this context, the load 4 with the regulator/controller can be configured as a separate component outside the integrated circuit 1, or can be produced directly in the integrated circuit.

With reference to FIG. 2, a further inventive configuration is shown. This configuration includes a reference-ground potential 3, a supply potential 2, and also a regulator/controller 6 for a load 5. The load 5 is controlled by means of a control signal 7, so that the power drawn by the integrated circuit 1 and by the load 5 is made uniform, at least intermittently.

The regulator/controller 6 ensures that the power drawn by the integrated circuit 1 and by the load 5 is approximately constant, so that the power impressed via the supply potential 2 and via the reference-ground potential 3 is uniform at least intermittently. To this end, the regulator/controller 6 measures the current impressed via the supply potential 2 and ensures that this current is approximately constant. This is achieved by controlling a load 5 by means of the control signal 7.

FIG. 3 shows a variant of the configuration illustrated in FIG. 2. The configuration differs from that shown in FIG. 2 in that the regulator/controller 6 measures only the current drawn by the integrated circuit 1, and does not, as in FIG. 2, measure the current drawn both by the integrated circuit and by the load. Again, the regulating/control unit 6 controls the power drawn by the load 5.

With reference to FIG. 4, another variant of the inventive configuration is illustrated. An integrated circuit 1 is connected to a reference-ground potential 3 and to a supply potential 2. In addition, a frequency controller 8 is provided which uses a frequency control signal 9 to control the operating frequency of the integrated circuit 1. This configuration makes it possible to match the operating frequency of the integrated circuit 1 to the present operating state. Thus, for example, the operating frequency of the integrated circuit 1 can be slowly reduced during relatively long idle phases of the integrated circuit 1, in order thereby to prevent current surges on the supply potential 2.

FIG. 5 shows a further example of an inventive configuration. A chip 10 is connected to a reference-ground potential 3 and to a supply potential 2. In this case, a capacitance is provided outside the chip 10. In this illustrative embodiment, the chip 10 has eight connections which are connected to the supply potential 2 and eight connections which are connected to the reference-ground potential 3. The eight lines for the reference-ground potential are shown in the chip 10 using an equivalent circuit diagram including a respective inductor and a respective resistor. Similarly, the eight lines for the supply potential are shown using a respective inductor and a respective resistor as an equivalent circuit diagram. The eight lines for the reference-ground potential 3 are connected together at a ground node 11, and the eight lines for the supply potential are connected together at a voltage node 12. Configured between the ground node 11 and the voltage node 12 are a load 5 and a capacitance. In addition, an integrated circuit 1 is connected to the ground node 11. The integrated circuit 1 is connected to a voltage regulator 6, which, for its part, is connected to the voltage node 12 and, by means of the control signal 7, to the control mechanism for the load 5.

In all of the aforementioned illustrative embodiments, the load 5 can be in the form of a controllable resistor, a transistor, or an integrated circuit. If the load 5 is in the form of an integrated circuit, then it can be designed such that circuit configurations equivalent to configurations of the integrated circuit are formed, which are activated and deactivated depending on the power consumption of the integrated circuit. A ring oscillator, for example, is suitable for this purpose, which can be enlarged or reduced depending on the power consumption of the integrated circuit 1. Alternatively, parallel ring oscillators can be activated.

I claim:

1. A circuit configuration for regulating power consumption of an integrated circuit, comprising:

an integrated circuit for drawing a power and having electrical contacts for connecting to a supply voltage; and a load for drawing a controllable power which is dependent upon the power drawn by said integrated circuit, said load being controlled such that a power consumed by a combination of said integrated circuit and said load is substantially constant.

2. The circuit configuration according to claim 1, wherein said load converts electrical energy into thermal energy.

3. The circuit configuration according claim 1, wherein said load draws more power when said integrated circuit is drawing relatively less power.

4. The circuit configuration according to claim 1, wherein the power drawn by said load is reduced during a period of time when the power drawn by said load is essentially constant.

5. The circuit configuration according claim 1, wherein said integrated circuit includes components selected from the group consisting of a load controller, a load regulator, and said load.

6. The circuit configuration according to claim 1, wherein said load includes components selected from the group consisting of a controllable resistor, a transistor, a capacitor, and a further integrated circuit.

7. The circuit configuration according claim 1, wherein a power consumption of a combination of said integrated circuit and said load is lowered when said integrated circuit is transferred to an idle state.

8. The circuit configuration according to claim 1, wherein said integrated circuit has an operating frequency that is lowered when said integrated circuit is transferred to an idle state.

* * * * *